United States Patent [19]

Genaw et al.

[11] Patent Number: 5,261,470
[45] Date of Patent: Nov. 16, 1993

[54] WHEELCHAIR TRACTION DEVICE FOR SNOW AND ICE

[75] Inventors: Randy D. Genaw, West Allis; Mark A. Kappel; Christopher J. Wieloch, both of Brookfield; Thomas J. Pokrzywinski, Milwaukee, all of Wis.

[73] Assignee: Handi-Trak Incorporated, West Allis, Wis.

[21] Appl. No.: 710,664

[22] Filed: Jun. 5, 1991

[51] Int. Cl.⁵ .................................... B60C 27/02
[52] U.S. Cl. ......................... 152/216; 152/213 R; 152/237; 280/304.1
[58] Field of Search .......... 152/186, 190, 210, 213 R, 152/216, 234, 175, 179, 235, 236, 237, 222, 208; 280/304.1

[56] References Cited

U.S. PATENT DOCUMENTS

| | | | |
|---|---|---|---|
| 544,688 | 8/1895 | Pulbrook | 152/167 |
| 753,285 | 3/1904 | Maxim | 152/173 |
| 1,389,204 | 8/1921 | McDermott | 152/234 |
| 1,930,585 | 10/1933 | Covey | 152/186 |
| 2,457,068 | 12/1948 | Peterson | 152/237 |
| 2,472,331 | 6/1949 | Koehler | 152/211 X |
| 2,535,299 | 12/1950 | Leach et al. | 152/186 |
| 3,007,506 | 11/1961 | Bowler | 152/175 |
| 3,323,572 | 6/1967 | Farah | 152/208 |
| 3,937,262 | 2/1976 | Lee | 152/210 X |
| 4,449,561 | 5/1984 | Head | 280/304.1 X |

Primary Examiner—Michael W. Ball
Assistant Examiner—Francis J. Lorin
Attorney, Agent, or Firm—Foley & Lardner

[57] ABSTRACT

A snow chain traction kit for the drive wheels of a wheelchair, the kit including a number of pairs of attachment strips for each wheel and a traction strap for each pair of strips, each of the straps having a plurality of chains for providing traction on ice or snow and each pair of strips being mounted on opposite sides of the wheels, with the straps wrapped around the tire and being attached to one pair of strips.

4 Claims, 3 Drawing Sheets

WHEELCHAIR TRACTION DEVICE FOR SNOW AND ICE

FIELD OF THE INVENTION

The present invention relates to wheelchairs and more particularly to a set of snow chain assemblies for the drive wheels of the wheelchair.

BACKGROUND OF THE INVENTION

Wheelchairs of the type contemplated herein, generally include a pair of drive wheels which are manually or power driven. The wheels are provided with pneumatic tires having various thread configurations to provide traction for ordinary use. These tires even though provided with special thread configurations may slip on any kind of slippery or icy surface. It is not unusual during cold weather for a wheelchair to become immobilized due to spinning of the drive wheels. The user is thereby subjected to unnecessary exposure to cold weather as a result of the inability of the wheelchair to move on such surfaces.

SUMMARY OF THE PRESENT INVENTION

The present invention relates generally to a snow chain kit which can be used to provide traction for the drive wheels of a wheelchair to prevent wheel slippage on icy surfaces. The kit generally includes a number of snow chain assemblies each of which includes a pair of attachment strips and a traction strap. One of the attachment strips is mounted on each side of the rim of the drive wheel. The traction strap is mounted on the tire with the ends of the strap attached to the attachment strips so that the strap overlies the tire. The attachment strap includes one or more chain segments which provide traction for the wheels on an icy surface. The traction straps can be quickly and easily attached to the attachment strips when required and removed when not required.

One of the primary advantages of the present invention is the ability of the snow chain assemblies to provide traction for the drive wheels of a wheelchair.

One of the features of the invention is the ability of the user when confronted with an icy condition to quickly apply the traction straps to the attachment strips without the assistance of a third party and without the necessity of getting out of the wheelchair.

A further feature of the present invention is the ability of the traction straps to provide a cushion effect which conforms readily to the configuration of the threads of the tire.

Other principal features and advantages of the invention will become apparent to those skilled in the art upon review of the following drawings, the detailed description and the appended claims.

DETAILED DESCRIPTION OF THE DRAWINGS

Figure 1:
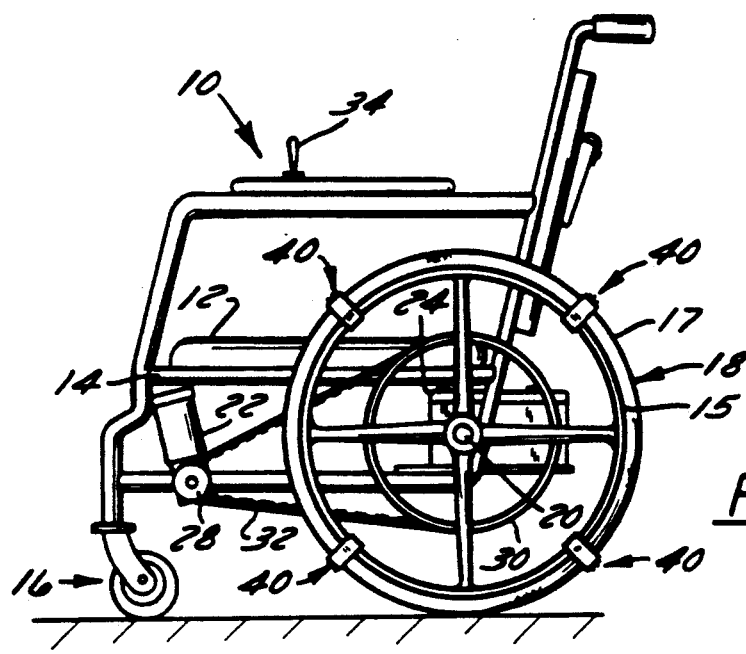
FIG. 1 is a side elevation view of a wheelchair showing the traction straps attached to the attachment strips on the drive wheel of the wheelchair.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

Referring to the drawings, a wheelchair 10 of the type contemplated herein is shown in FIG. 1. It should be noted that the snow chain assemblies can be mounted on any three wheel type porta carrier as well as motorized or manually driven wheelchairs. A wheelchair generally includes a seat 12 mounted on a supporting frame 14. A pair of swivel type wheel assemblies 16 are provided in the front and a pair of drive wheels 18 are mounted on an axle 20 in the rear of the chair. Each wheel includes a rim 15 and a rubber tire 17. Each of the drive wheels 18 is driven by a separate motor 22 which is connected to a battery 24. Each motor 22 includes a drive pulley 28 which is connected to a driven pulley 30 on the rear wheel by means of a belt 32. As is generally understood, a hand operated control lever 34 is provided on the wheelchair to selectively operate the motors to drive the rear wheels. The operation of the wheelchair is well known and involves merely moving the control levers 34 in the direction you want to go to energize one or both of the motors 22 depending on the intended direction of travel.

Figure 6:
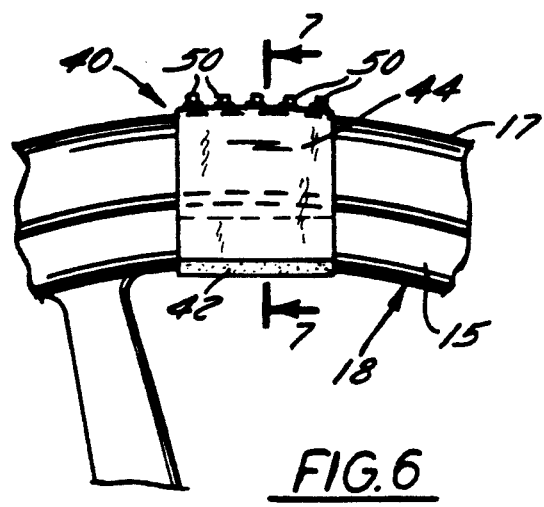
FIG. 6 is a view of the traction strap mounted on the attachment strip on the wheel.
Figure 2:
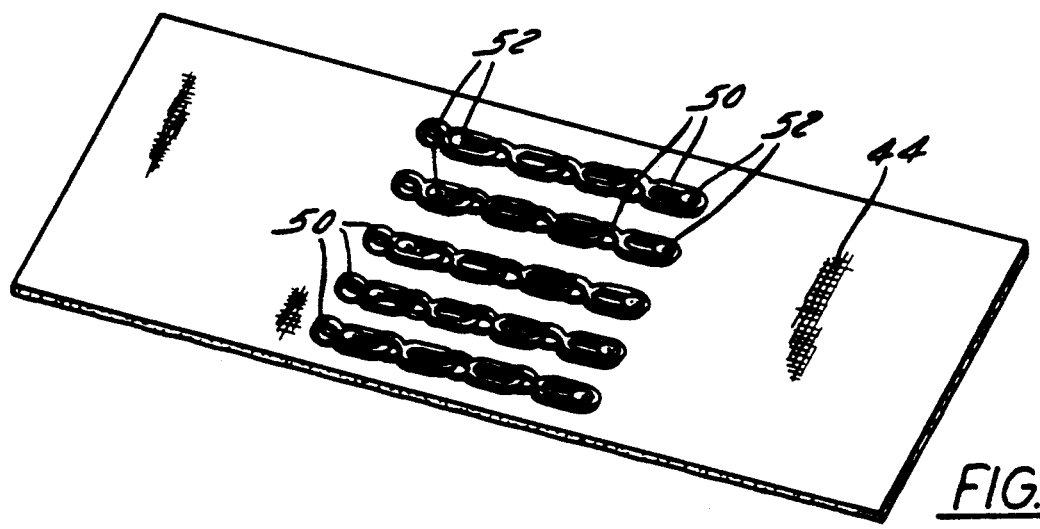
FIG. 2 is a perspective view of one of the traction straps of the snow chain assembly according to the present invention.
Figure 3:
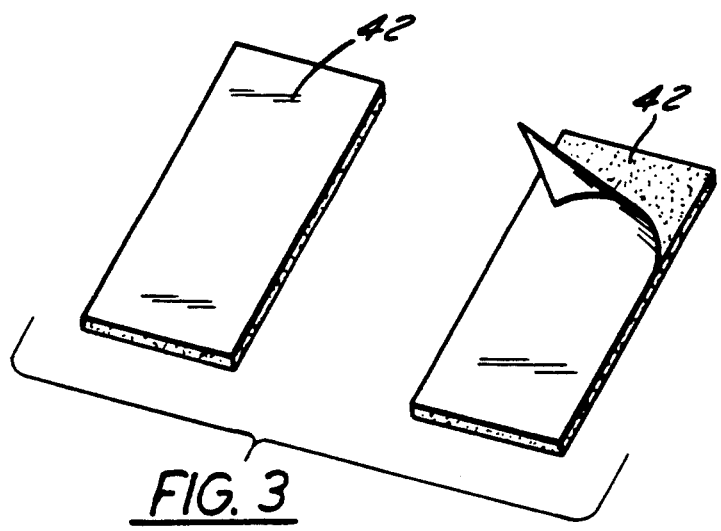
FIG. 3 is a perspective view of the attachment strips for the snow chain assembly.
Figure 7:
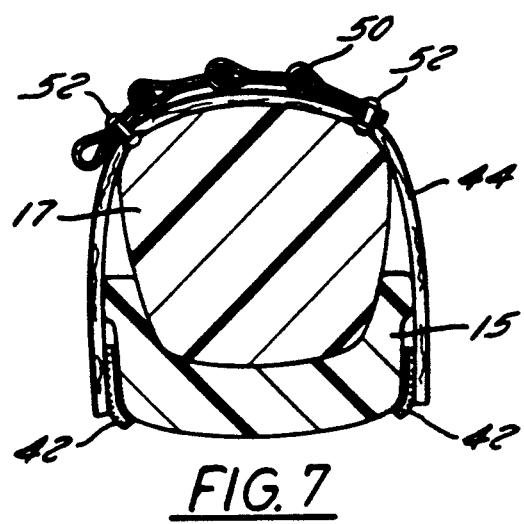
FIG. 7 is a view taken on line 7—7 of FIG. 6.

In accordance with the present invention snow chain assemblies 40, as seen in FIGS. 1 and 6, are mounted on the drive wheels 18 at spaced intervals. Each assembly 40 generally includes a pair of attachment strips 42 and a traction strap 44. The attachment strips 42 are of the hook type and the traction straps 44 are of the loop type more commonly referred to as a VELCRO ® connection. Connection is made between the opposing hook and loop surfaces by merely pressing the hook surface of the strap into engagement with the loop surface of the strip. The straps 44 are provided with the "loops" and the strips 42 are provided with the "hooks," however the loops and hooks could be reversed. Although only one assembly 40 is shown and described herein, it should be understood that a kit would include six or eight such assemblies for each wheel in order to provide sufficient traction to move the wheelchair over ice or snow.

Figure 4:
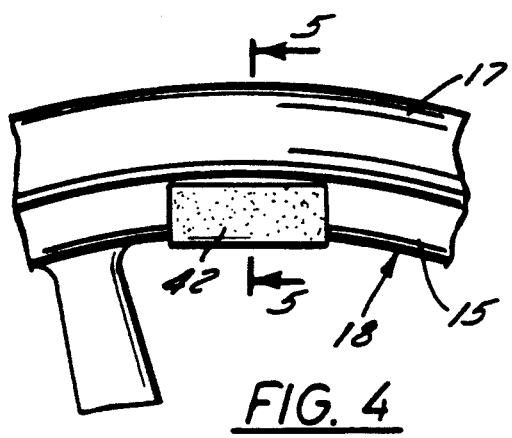
FIG. 4 is a view of one of the attachment strips mounted on the side of a wheel.
Figure 5:
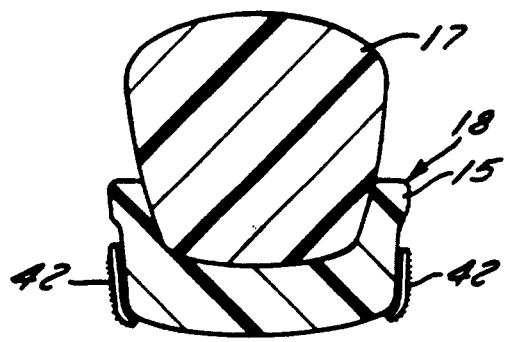
FIG. 5 is a view taken on line 5—5 of FIG. 4.

The attachment strips 42 are secured to the sides of the wheel in the spaces between the spokes as shown in FIG. 4. The strip 42 is secured to the wheel by an adhesive which will provide a strong attachment of the strip 42 to the wheel.

Each of the straps 44 is provided with a number of links of chain 50 which are secured to the straps by means of clips or pins 52 or the like. It should be noted that the chains 50 are loose on the straps to allow for movement of the chains to provide positive traction with the ice or snow. The chains are mounted in a generally parallel relation to the longitudinal axis of the straps 44. The chains 50 will be located in a transverse relation to the direction of motion of the wheel when the straps 44 are mounted on the wheels of the wheelchair. The ends of the straps 44 are secured to the strips 42 by merely pressing the loop surface of the straps onto the hook surface of the strips as described above.

It should be noted that the straps 44 can be carried in a packet or pouch either on the wheelchair or on the driver. The straps 44 should be readily available to the occupant of the wheelchair for mounting on the wheels while seated in the wheelchair. When the traction straps 44 are not required, they can be quickly and easily removed by the occupant by merely peeling the straps 44 off of the strips 42. With this arrangement, the user will always have access to the straps whenever an icy condition is present.

Figure 8:
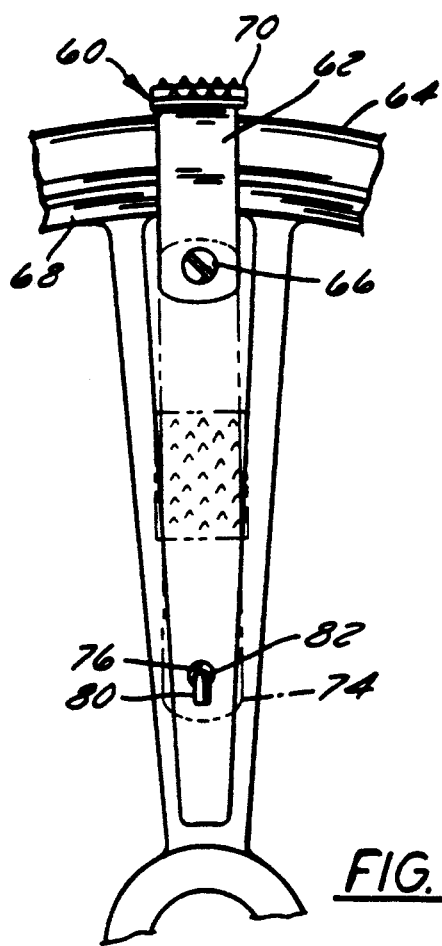
FIG. 8 is a side view of a modified traction strap.
Figure 9:
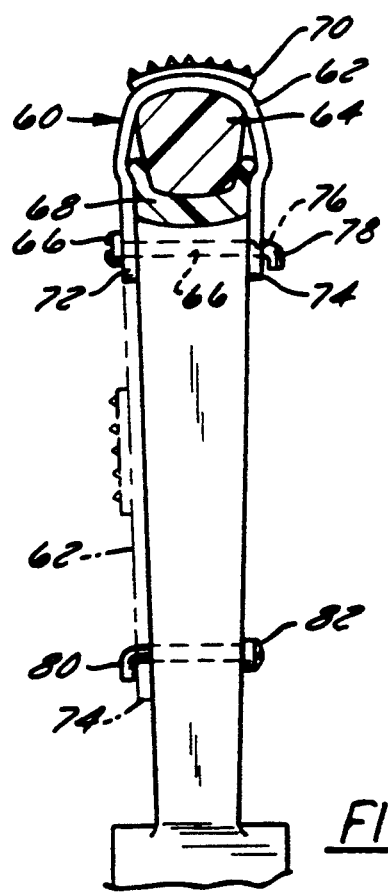
FIG. 9 is a cross-section view of the traction strap of FIG. 8 shown in the storage position.

In the alternate embodiment of the invention, shown in FIGS. 8 and 9, a snow chain assembly 60 is shown which is stored directly on the wheel. The assembly 60 includes a stretch band 62 which is wrapped around the tire 64 and connected to a pin 66 mounted inside of the rim 68. A traction plate 70 in the form of a set of chains or other traction material is provided on the surface of the band 62. The band 62 has one end 72 permanently secured to one end of the pin 66. The other end 74 of the strap includes a hole 76 which is stretched over a hook 78 provided on the other end of the pin 66. When the snow chain band 62 is not required, the end 74 is pulled down so that the hole 76 clears the hook 78. The band is then pivoted around the pin 66 and the end 74 is pulled down to align the hole 76 with a hook 80 on a storage retention pin 82 located on the wheel.

Thus, it should be apparent that there has been provided in accordance with the present invention a wheelchair traction device for snow and ice that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A snow chain assembly for a drive wheel of a wheelchair, said assembly comprising an attachment strip mounted on each side of the drive wheel, a traction strap mounted on the drive wheel overlapping said attachment strips, and traction means mounted on a first surface of said strap to provide traction for the drive wheel on ice or snow wherein said traction strap is provided with loop fastening material on a second surface opposite the first surface and said strip is provided with hook fastening material on one surface whereby said straps are removable mounted on said strips by forcing the loop fastening material on said straps into engagement with said hook fastening material on said strips.

2. The assembly according to claim 1 wherein said traction means comprises a plurality of chains loosely mounted on said strap.

3. A snow chain traction kit for the drive wheels of a wheelchair, said kit comprising a plurality of pairs of attachment strips adapted to be mounted on opposite sides of each wheel, and a plurality of traction strips, one strap for each pair of said strips, respectively, each of said straps including a plurality of chains on one side for providing traction on ice or snow, a hook fastening material provided on one side of each end of said straps or on one side of said strips and opposite the side for mounting on a wheel, and a loop fastening material on the respective other of said straps or strips, whereby each of said straps is mounted by wrapping over a wheel with the fastening material of said straps being removably attached to the fastening material on said respective pair of strips by forcing the loop fastening material into engagement with the hook fastening material.

4. The assembly according to claim 3 wherein each of said strips includes an adhesive on a side opposite the fastening material for securely mounting said strips onto the drive wheels.

* * * * *